United States Patent [19]
Johnson

[11] Patent Number: 4,775,359
[45] Date of Patent: Oct. 4, 1988

[54] BAG AND TUBE FOLDING METHOD AND APPARATUS

[75] Inventor: William C. Johnson, Omaha, Nebr.

[73] Assignees: Rand Farm Systems Inc., Adrian, Mo.; Poly Farm, Inc., Dallas, Tex.

[21] Appl. No.: 697,210

[22] Filed: Jan. 31, 1985

[51] Int. Cl.[4] .................... B31B 39/52; B65H 45/107
[52] U.S. Cl. .................................. 493/381; 493/217; 493/413; 493/451
[58] Field of Search ............... 493/217, 413, 451, 940, 493/941, 243, 381

[56] References Cited

U.S. PATENT DOCUMENTS

| | | | |
|---|---|---|---|
| 3,279,784 | 10/1966 | Schwendinger | 493/413 |
| 4,106,398 | 8/1978 | Buisson | 493/356 |
| 4,265,439 | 5/1981 | Sundberg | 493/940 |
| 4,424,051 | 1/1984 | Lee et al. | 493/217 |

Primary Examiner—Frederick R. Schmidt
Assistant Examiner—William E. Terrell
Attorney, Agent, or Firm—Laney, Dougherty, Hessin & Beavers

[57] ABSTRACT

A method for folding a tube into radially superimposed accordian pleats in which the tube is first placed in tubular form and clamped against radial and longitudinal movement at circumferentially spaced zones adjacent an open end of the tube. A first annular band of the tube is then forced radially outwardly and longitudinally to a position radially outwardly of the clamped zones, and is connected by a bight to the remainder of the tube, a part of which forms a second annular band lying radially outwardly from the first band. The two annular bands and the part of the tube containing the spaced zones are then clamped against radial and longitudinal movement, and a series of additional pairs of bands are then sequentially formed radially outwardly from the second band in the same way that said first and second bands are formed, with periodic clamping of all of said bands against radial and longitudinal movement occurring after each additional pair of bands is formed. The invention is also directed to an apparatus for placing radially superimposed accordian pleats in a tube which includes a forming structure to hold the tube in a distended tubular form while it is alternately contacted by a series of clamping fingers and a series of pleat folding fingers, which latter fingers function to move sections of the bag radially outwardly and longitudinally into a configuration constituting radially superimposed bands.

50 Claims, 5 Drawing Sheets

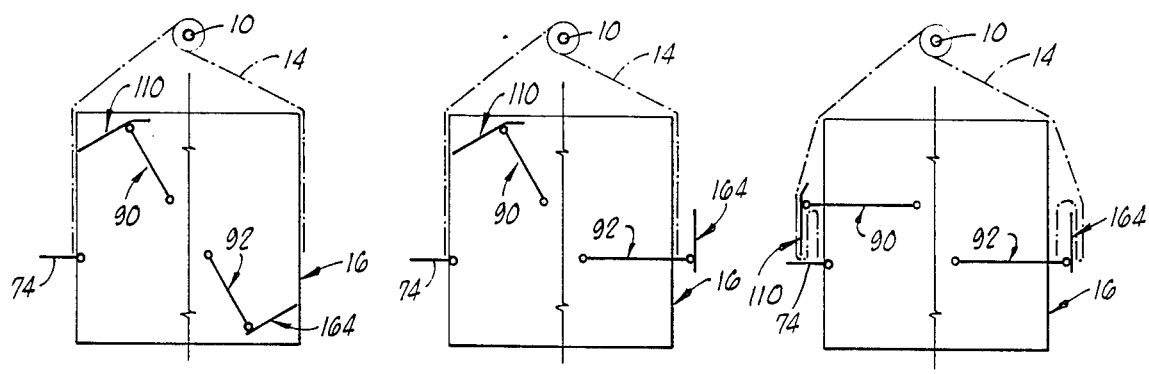
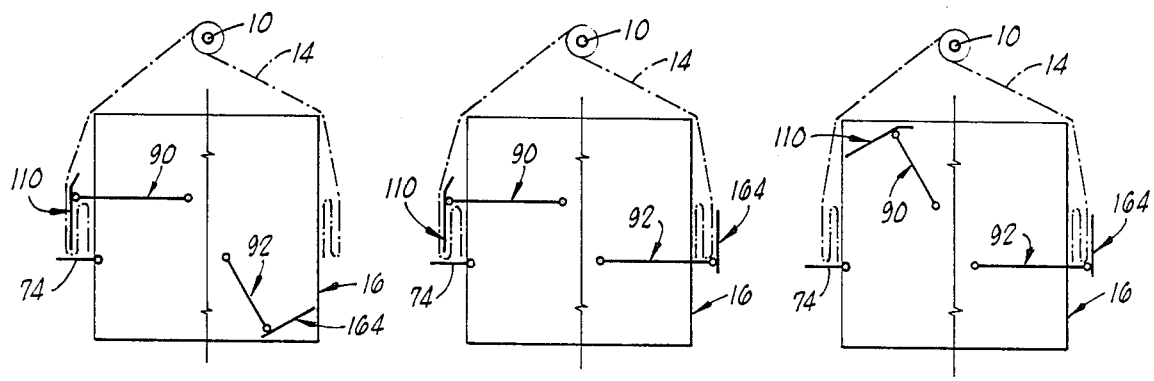
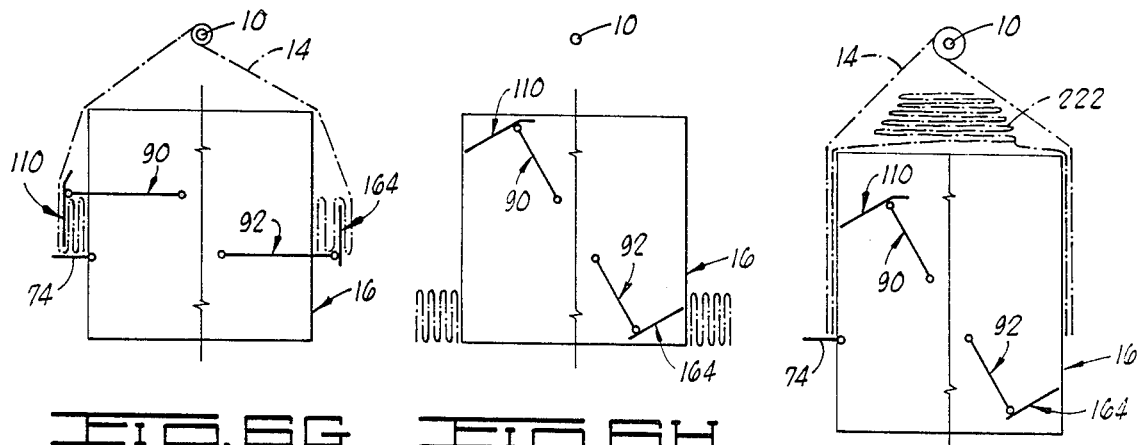

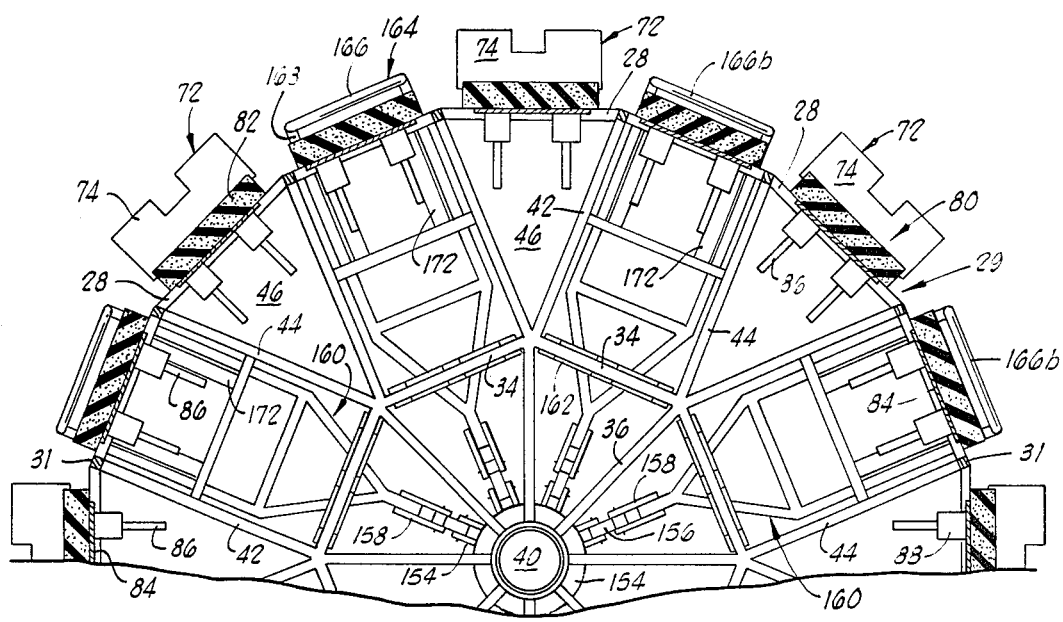
FIG. 8
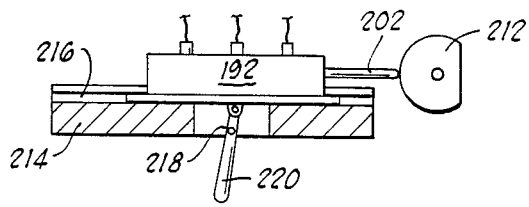
FIG. 9
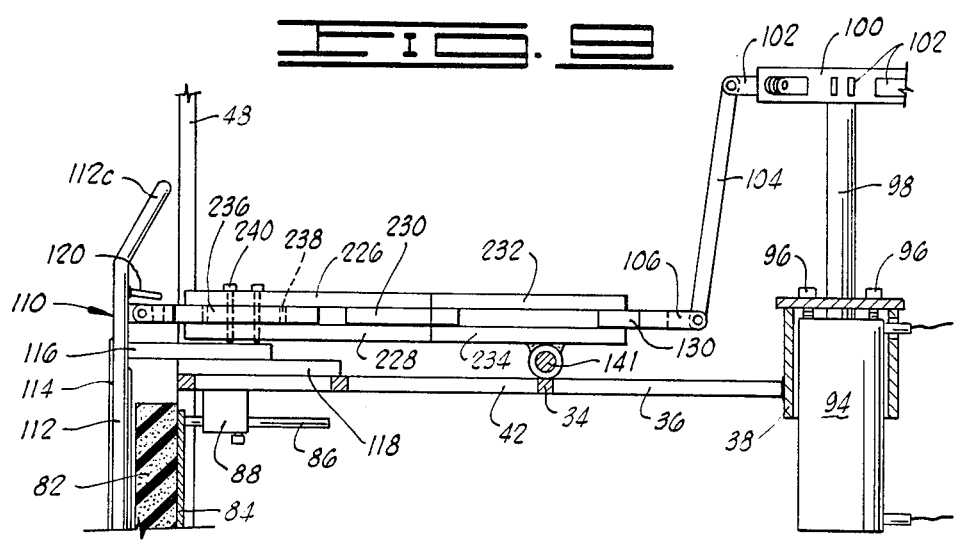
FIG. 10

BAG AND TUBE FOLDING METHOD AND APPARATUS

FIELD OF THE INVENTION

This invention relates to the folding of long, flexible tubes into a series of accordian pleats, and more particularly, but not by way of limitation, to a method of preparing long tubular bags in a compact pleated form allowing expansion of the effective length of the bag during loading through the open end thereof. The invention also relates to an apparatus for forming radially superimposed pleats in a tube having at least one open end.

BACKGROUND OF THE INVENTION

A recently developed method of feeding livestock entails filling long plastic bags with fodder and feeding the stock from this bag over an extended period of time. Bags used for this purpose are often at least 4 feet in diameter and from 30 to 150 feet in length. Filling bags of this type with particulate or shredded fodder is difficult to quickly and effeciently accomplish, largely due to the length of the bag. A technique widely used has entailed crumpling or wadding up the bag over much of its length, then gradually filling the bag from its closed end outwardly toward its open end, paying out the bag from its wadded or randomly folded portion as filling progresses.

More recently, efforts have been made to actually fold flexible tubes of the type described by hand in a way such that a series of pleats or folds are provided adjacent the open end of the bag, thereby facilitating a more regular and true payout of the bag as it is filled with fodder. Attempting to manually fold bags of the size described, however, has been extremely difficult and time consuming, and the folds usually do not run true and uniformly when this method is undertaken.

GENERAL DESCRIPTION OF THE PRESENT INVENTION

The present invention includes an apparatus by means of which large flexible tubes can be automatically folded into a series of radially superimposed accordian pleats which are formed adjacent an open end of the tube. The tube can subsequently be closed at some point along its length to provide a bag suitable for containing fodder, and for feeding livestock from the bag.

Broadly described, the apparatus used in developing the pleats includes a forming structure over which the tube is stretched to open it to its full diameter, generally cylindrical tubular form. Mounted on the forming structure are a pair of sets of clamping fingers, which sets of fingers are alternately actuated so as to both clamp the tube around the forming structure adjacent its open end, and to develop folds in the form of superimposed annular bands, as the sets of fingers undergo oscillating movements. One set of the fingers, upon undergoing oscillation, functions to move sections of the bag radially outwardly and longitudinally into a configuration constituting radially superimposed annular bands, and this action is carried out while the second set of fingers clamp that portion of the bag which has already been folded against radial and longitudinal movement.

The invention also includes the methodology which is employed in developing radially superimposed accordian pleats in the tube.

An important object of the present invention is to provide a much faster and more efficient method of developing a series of regular and uniform accordian pleats in radially superimposed array adjacent the open mouth of a flexible tube.

A further object of the invention is to provide a method and apparatus by which a bag suitable for storing fodder or other livestock feed can be developed in a form which permits the fodder to be easily and quickly loaded into the bag, and so that the bag can quickly be made field-ready for feeding the fodder to livestock directly from the bag.

Additional objects and advantages of the invention will become apparent as the following detailed description of the invention is read in conjunction with the accompanying drawings which illustrate preferred embodiments of the invention.

BRIEF DESCRIPTION OF THE DRAWINGS

FIGS. 6a through 6h are diagrammatic illustrations of the principal operative subassemblies of the tube folding apparatus of the invention showing, in sequence, the motions undergone by the finger clamping and folding subassemblies in the course of developing the radially superimposed accordian pleats in a tube being folded.

FIG. 7 is a further diagrammatic illustration of the apparatus of the invention showing the manner in which the apparatus is employed for the purpose of forming radially superimposed accordian pleats in a double-walled tube which is developed as the apparatus is utilized.

FIG. 8 is a partial horizontal sectional view similar to FIG. 4, but illustrating the manner in which a different clamping finger subassembly is mounted in the apparatus.

FIG. 9 is an elevation view showing a manual override structure constituting a part of the tube folding apparatus of the invention.

FIG. 10 is a side elevation view of structural details included an alternate embodiment of a crank link means used in the tube folding apparatus of the invention.

DETAILED DESCRIPTION OF PREFERRED EMBODIMENTS OF THE INVENTION

Figure 1:
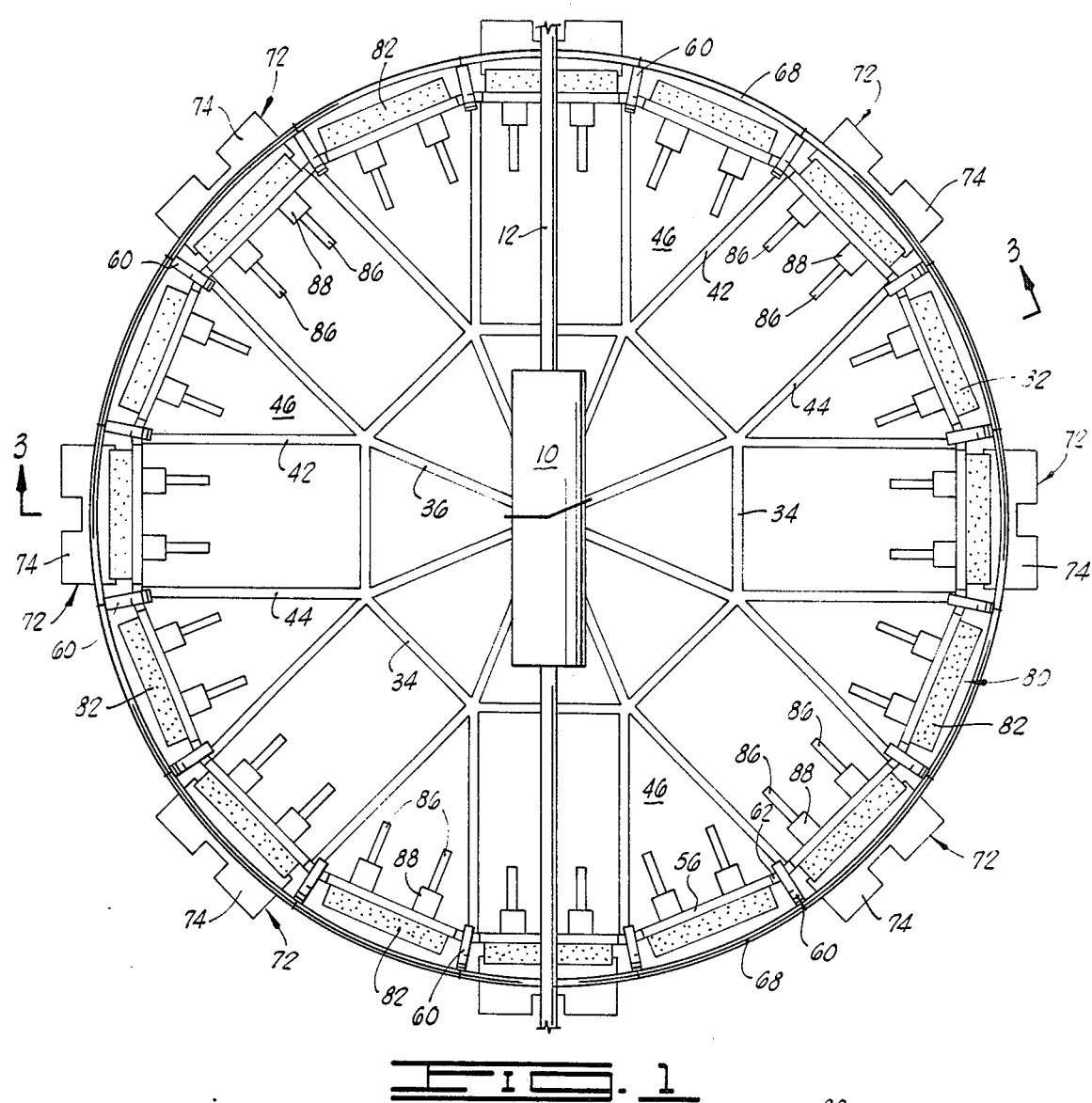
FIG. 1 is a plan view, with some parts removed for clarity of illustration, of the tube folding machine of the invention.
Figure 3:
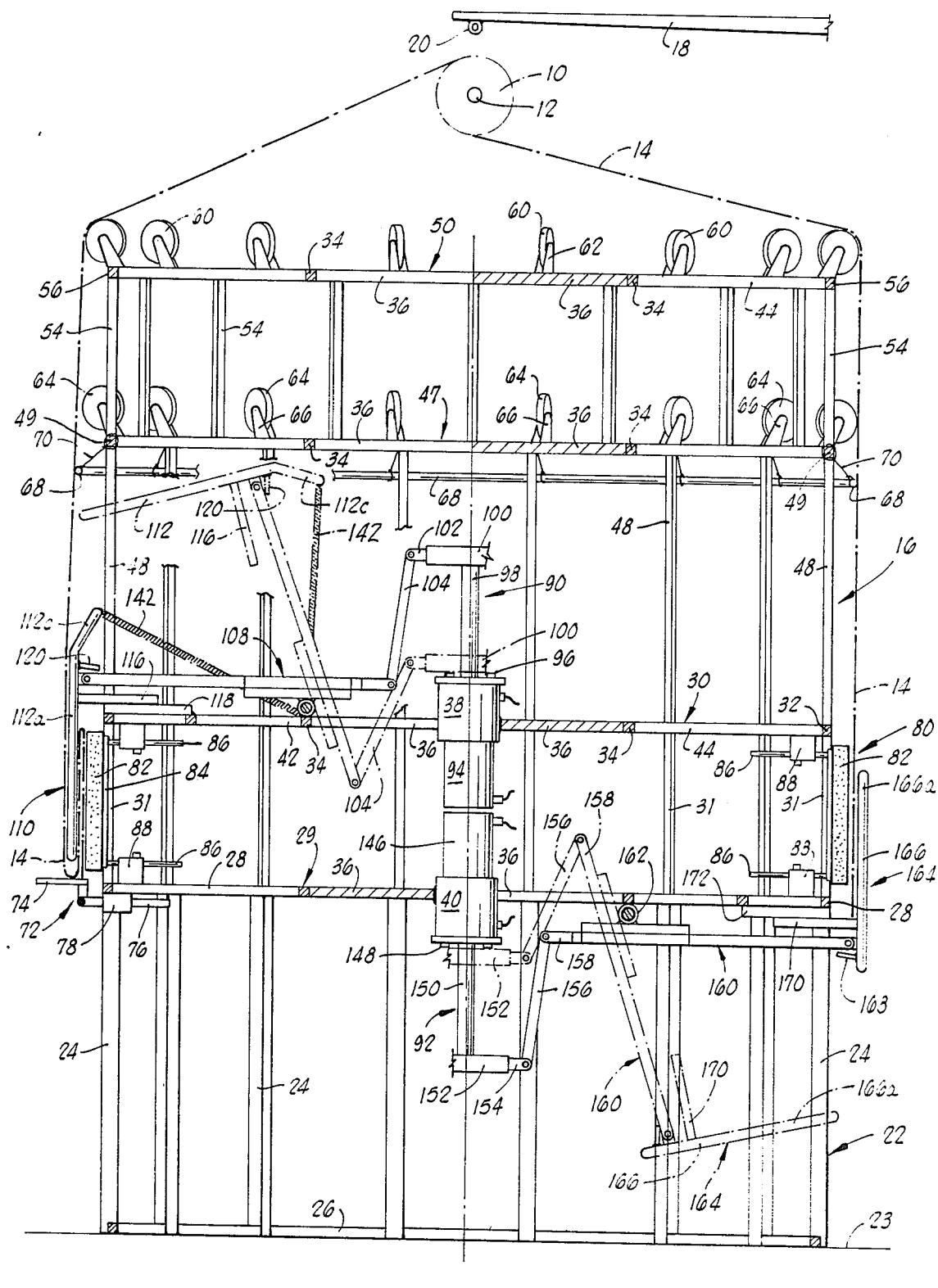
FIG. 3 is a vertical sectional view taken along line 3—3 of FIG. 1.

Referring initially to FIGS. 1 and 3 of the drawings, the tube folding apparatus of the invention includes a rotatably mounted cylinder or drum 10 which is supported on a suitable axially extending shaft 12. The roller 10 functions to support a roll of flexible material in tubular form, and which is to be folded so as to develop the tube into a plurality of radially superimposed accordian pleats. A typical tube is schematically portrayed in the drawings by the dashed line and denominated by reference numeral 14. The tube 14 is typically configured as an elongated cylindrical structure which is flexible, and slightly resilient, and is preferably formed of a synthetic resin material such as polyethylene, polypropylene, polyvinylchloride or the like. The tube 14 must have at least one open end, and may be open at both ends.

Since one of the principal uses of the present invention is in developing a pleat-folded bag for use in storing and feeding fodder, which bag is required to be quite large, a tube folded with the apparatus of the invention typically is from about 4 to 10 feet in diameter, and from about 30 to 150 feet long. Other sizes of tubes can, of course, be folded on apparatus constructed identically to that which is described herein, with appropriate scaling of the structural components in accordance with variations in desired tube size.

Space considerations and economics of construction dictate that a large tube 14 is preferably placed on the cylindrical drum 10 in a folded form in which the tube is folded at least once, and sometimes twice, along longitudinal fold lines extending from one end of the tube to the other. From the drum 10, the tube 14 is unrolled and simultaneously unfolded so as to be opened about the longitudinal fold line to expose an open end of the tube. This permits the tube to be flared to its full circular crosssectional configuration at its open end.

Located directly below the cylindrical roller or drum 10 is a large, generally cylindrical forming and folding framework or structure designated generally by reference numeral 16. Positioned above the drum 10 is a cantilevered lifting arm 18 which has secured to its outer end, a sling-receiving eye 20, the purpose of which will be hereinafter explained. The lifting arm 18 is connected at its end opposite the eye 20 to suitable lifting apparatus (not shown), such as a lifting winch or hydraulic elevating system, which functions to cause vertical movement of the outer end of the arm 18 at a time subsequent to the completion of the folding of the tube 14 into superimposed accordian pleats as hereinafter described.

Figure 4:
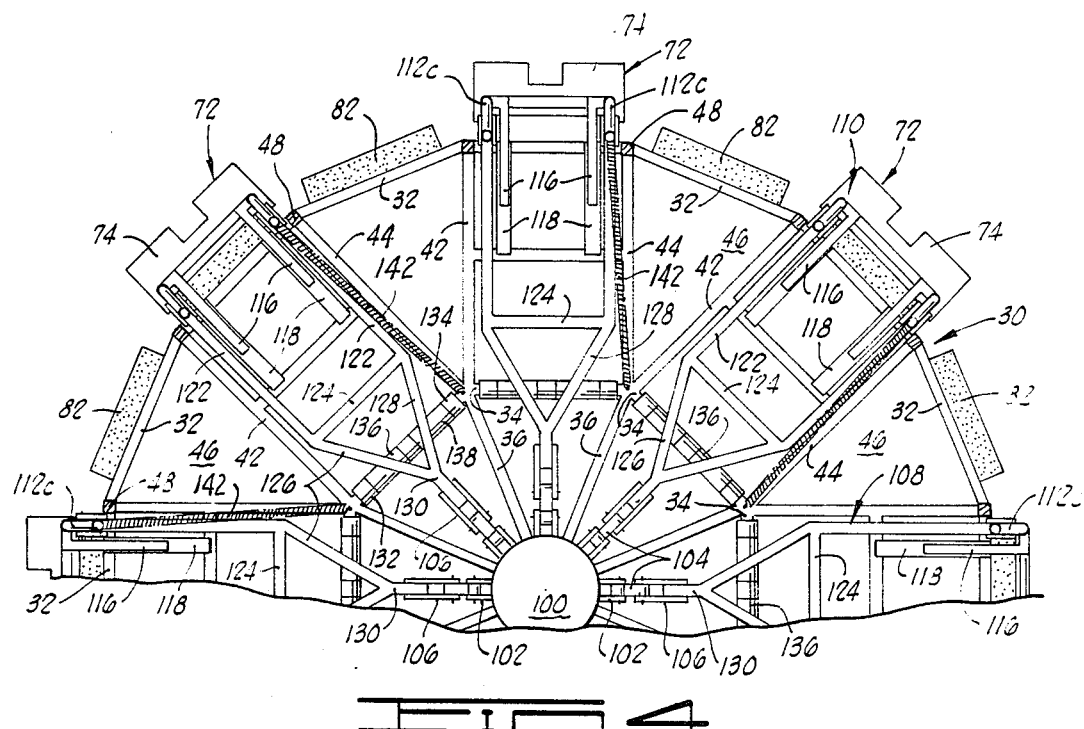
FIG. 4 is a partial horizontal sectional view taken through the center of the tube folding apparatus and illustrating the manner in which the clamping and folding finger subassembly is mounted in the apparatus.

The forming and folding structure 16 includes a base substructure, designated generally by reference numeral 22, which base structure is adapted to rest flatly upon a floor 23 or other supporting structure. The base substructure 22 is generally cylindrical in configuration, or of polygonal cross-section, and includes a plurality of vertically extending stanchions or posts 24 which are secured at their lower ends to a lower perimeter frame element 26. The lower perimeter frame element 26 can be either circular in configuration or can be of polygonal configuration in conformity with the overall general shape of the illustrated forming and folding structure 16 as hereinafter explained. The vertically extending posts 24 support at their upper ends, a plurality of interconnected, horizontally extending perimeter frame elements 28. The frame elements 28 are collectively arrayed in a large, sixteen-sided base subframe 29 which forms the top of the base 22 (see FIG. 1). This base subframe 29 is substantially identical in configuration and construction to a lower or first intermediate subframe 30 which is spaced vertically upwardly therefrom, and is illustrated in FIGS. 1 and 4. The first intermediate subframe 30 is supported above the base subframe 29 by means of a series of vertically extending rods or bars 31. The first intermediate subframe 30 is offset circumferentially about the central vertical axis of the forming structure 10 in its geometric relationship to the lower subframe in a way and for a purpose which will hereinafter be further described. This offset, which is by an angle of $22\frac{1}{2}°$, is best discerned by comparing FIGS. 4 and 8.

For the purpose of describing the construction of both the base subframe 29 and the first intermediate subframe 30, reference is made to FIG. 4 where a portion of the first intermediate subframe is illustrated. The horizontally extending perimeter frame elements 32, part of which are shown in FIG. 4, correspond in number, construction and function to the perimeter frame elements 28 in the base subframe, and are spaced directly above corresponding frame elements 28 in the base subframe. Thus, sixteen of the perimeter frame elements 32 are interconnected to form a sixteen-sided polygon. Both the first intermediate subframe 30 and the base subframe 29 include an octagonally-shaped inner ring formed by interconnected bars 34 which are joined by radially inwardly extending spokes 36 to cylinder-supporting socket sleeves. In the case of the subframe 30, the spokes 36 are joined to, and support, a cylindersupporting socket sleeve 38 as shown in FIG. 3, while in the case of the spokes 36 of the base subframe 29, these spokes 36 are joined at their radially inner ends to, and provide support for, a cylinder-supporting socket sleeve 40. Each of the bars 34 in the octagonal inner ring centrally positioned within each of the base and first intermediate subframes 29 and 30, respectively, is connected by a pair of parallel frame bars 42 and 44 to opposite ends of one of the respective horizontally extending perimeter frame elements, which are denominated 32 in the case of the first intermediate subframe 30, and 28 in the case of the base subframe 29. The bars 34, parallel frame elements 42 an 44, and the respective outer perimeter frame elements, 32 or 28, thus form a rectangular structure, and the several rectangular structures thus formed are separated by triangular spaces 46 as illustrated in FIGS. 4 and 8.

Spaced upwardly from the first intermediate subframe 30 is a pair of additional identically shaped subframes. Thus, a second intermediate subframe designated generally by reference numeral 47 is supported above the first intermediate subframe 30 by means of a plurality of vertically extending posts 48 which project between the perimeter frame elements 32 of the first intermediate subframe 30 and corresponding horizontally extending perimeter frame elements 49 of the second intermediate subframe 47. A top subframe 50 is supported above the second intermediate subframe 47 by plurality of vertically extending posts or bars 54 which project between the perimeter frame elements 49 of the second intermediate subframe 47 and structurally and functionally identical perimeter frame elements 56 of the top subframe 50. The second intermediate subframe 47 and the top subframe 50 are configured and constructed substantially identically to the first intermediate subframe 30 and the base subframe 29, and thus, in plan view, are sixteen-sided at their outer peripheries, and include parallel frame bars 42 and 44, as well as the octagonforming bars 34 and the spoke elements 36. The second intermediate subframe 47 and the top subframe 50 have their frame bars 34, 42 and 44 and the spokes 36 positioned in alignment with the corresponding elements in the first intermediate subframe 30.

On the stop subframe 50 where the parallel frame bars 42 and 44 join the perimeter frame elements 56, a plurality of guide rollers 60 are mounted in supporting brackets 62 and constitute a first internal support for a flexible bag or tube. The supporting brackets 62 are angled radially outwardly so to position the outer peripheries of the several guide rollers 60 outside the periphery of the top subframe 50 as illustrated in FIGS. 1 and 3. In similar fashion, a plurality of lower guide rollers 64 are supported by brackets 66 secured to the second intermediate subframe 47 at points on the periphery of this subframe where the parallel frame bars 42 and 44 intersect and are joined to the horizontally extending, perimeter frame elements 49.

A static brake ring 68 is mounted outside of and around the bars 48 by means of a plurality of flexible stays 70 suitably secured to the horizontally extending perimeter frame elements 49 of the second intermediate subframe 47.

Mounted immediately beneath the base subframe 29, and at circumferentially spaced locations around the periphery thereof, are a plurality of tube-supporting foot plate subassemblies, each designated generally by reference numeral 72. Each of the foot plate subassemblies 72 includes a horizontally extending foot plate 74 which is carried at the outer ends of a pair of parallel rods 76 as shown in FIG. 1. The parallel rods 76 extend through a pair of slide blocks 78, which slide blocks are secured by welding or other suitable means to the underside of the perimeter frame elements 28. As will be subsequently explained, the rods 76 can be pulled outwardly through the slide blocks 78 to permit the foot plates 74 to be removed from the forming and folding structure 16 upon completion of the folding operation, and for the purpose of permitting the folded tube to be removed from the apparatus.

It will be noted in referring to FIGS. 1 and 4 that the tube-supporting foot plate subassemblies 72 are circumferentially spaced around the forming and folding structure 16, and that each subassembly 72 is located in radial alignment with one of the rectangular structural frame figures formed by the respective parallel frame bars 42 and 44, a perimeter frame elements 32 and a respective bar 34, all as located in the first intermediate subframe 30. Stated differently, the several foot plate subassemblies 72 are spaced so that none of them are disposed immediately radially outwardly of one of the triangular spaces 46 which are circumferentially spaced at regular intervals around the first intermediate subframe. Since the base subframe 29 is circumferentially offset by 22½ from the first intermediate subframe 30, however, each foot plate subassembly is in radial alignment with one of the triangular spaces 46 in the base subframe as illustrated in FIG. 8.

A series of resilient restraining pads subassemblies 80 constitute a second internal support for holding a tube or bag, are also positioned around the periphery of the forming and folding structure 16 at locations between the first intermediate subframe 30 and the base subframe 29. When a sixteen-sided forming and folding structure 16 of the type described is in use, sixteen of the resilient restraining pad subassemblies 80 will be utilized. Each of the resilient restraining pads subassemblies 80 includes a rectangular pad 82 of foamed rubber or synthetic resin material which is secured to a rigid backing plate 84, and is mounted so that its outer face extends vertically and faces outwardly from the forming and folding structure 16. The rigid backing plate 84 is provided with four radially inwardly extending slide shafts 86 which extend slidably through slide blocks 88 which are suitably secured to the underside of the first intermediate subframe 30 and to the upper side of the base subframe 29 as shown in FIG. 3. It will be noted in referring to FIG. 1 that one of the resilient pads 82 is disposed immediately over each of the horizontally extending foot plates 74, and that there are also a series of alternately located or circumferentially spaced resilient pads 82 located in the circumferential spaces between those pads which are located directly over the several foot plates 74.

An upper folding and clamping finger subassembly, designated generally by reference numeral 90, is mounted upon the first intermediate subframe 30, and a lower clamping finger subassembly 92 is mounted upon the base subframe 29 as illustrated in FIG. 3.

Figure 5:
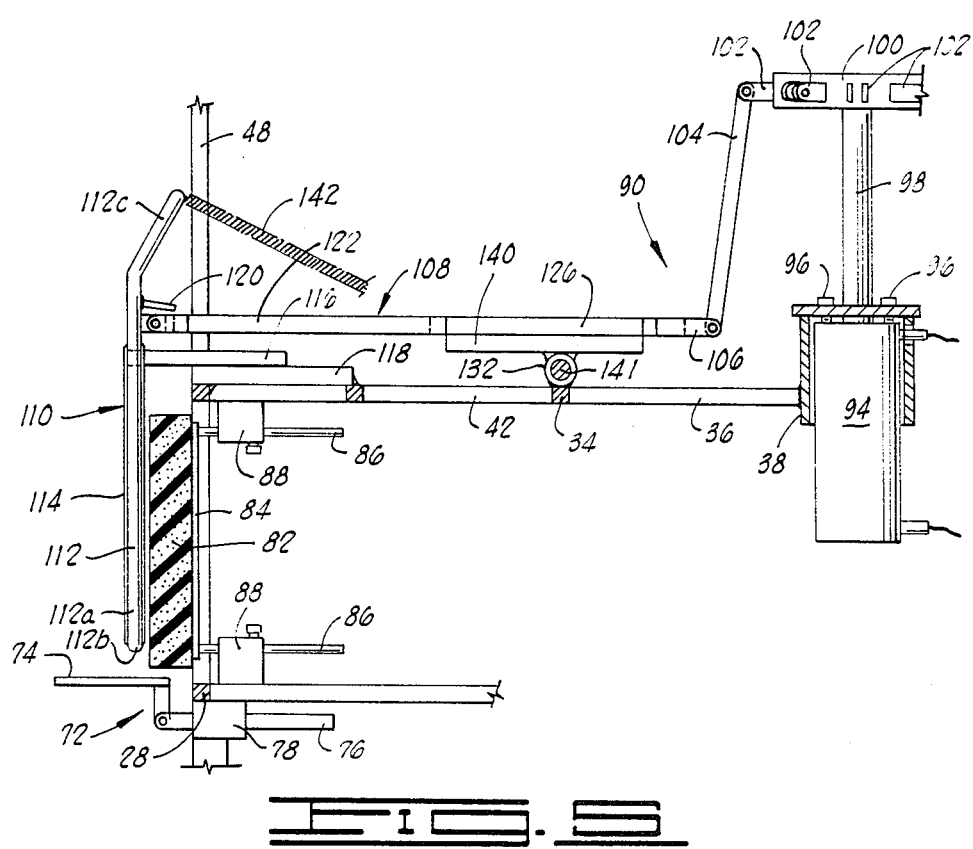
FIG. 5 is a side elevation view of structural details of a part of the clamping and folding finger subassembly. A portion of one of the sleeve wells in which one of the hydraulic actuating cylinders is located has been illustrated in section, as have other structural elements, for clarity of illustration.

A part of the upper folding and clamping finger subassembly 90 is illustrated in detail in FIG. 5 and, in the illustrated embodiment, includes the double acting, pneumatically powered cylinder 94 which is mounted for sliding, reciprocating movement within the cylinder supporting socket sleeve 38. The pneumatic cylinder 94 can be moved upwardly or downwardly relative to the socket sleeve 38 by means of adjusting screws 96 which are extended into the housing of the cylinder through a cap plate forming a part of the socket sleeve 38.

Extending from the pneumatic cylinder 94 is an elongated piston rod 98. The piston rod 98 is threaded or otherwise suitably secured at its outer end to a drive plate 100. The double acting, pneumatically powered cylinder 94 and piston rod 98, together with the corresponding cylinder and piston rod elements utilized as a part of the lower clamping finger subassembly 92 and hereinafter described, constitute a moving means which is mounted, through supporting base and intermediate subframes 29 and 30, respectively, on the forming and folding framework. This moving means functions to shift the clamping structure, and to move the folding means at periodic and synchronized intervals, as hereinafter explained in detail.

Figure 2:
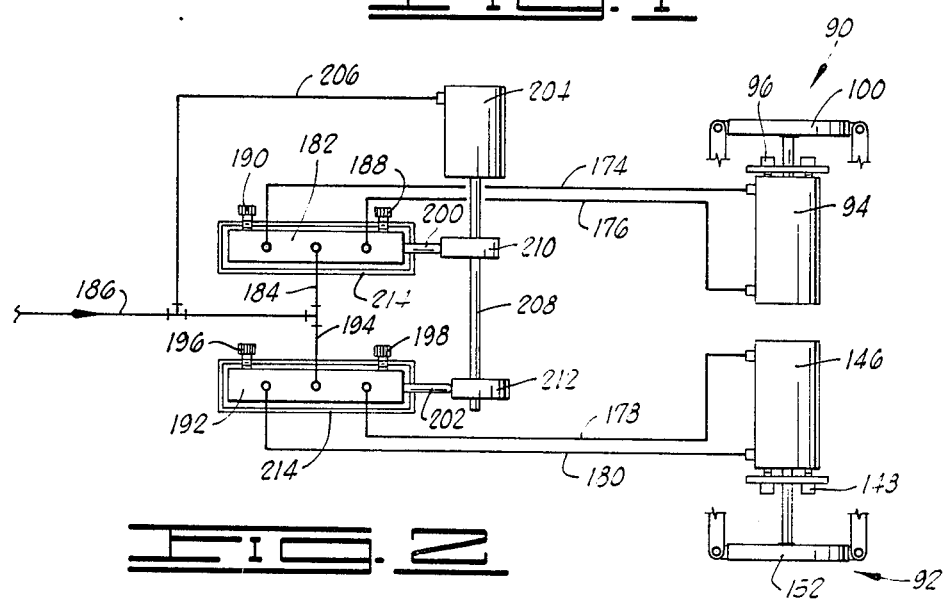
FIG. 2 is a schematic flow diagram of a pneumatically powered system used for operating the clamping and folding fingers forming a part of the tube folding apparatus of the invention.

Forming a part of this moving means is a synchronizing means as illustrated in FIG. 2 of the drawings, and hereinafter described in detail. The drive plate 100 has secured around its outer periphery, eight pairs of circumferentially spaced linkage brackets 102. Each pair of the linkage brackets 102 functions to pivotally engage one end of a downwardly extending lever arm 104 as illustrated in FIGS. 3, 4 and 5. Each lever arm 104 is pivotally connected at its lower end through a pair of short connecting plates 106 to one end of an elongated crank link means 108. At its end opposite the end connected to the respective lever arm 104, each of the crank link means 108 is pivotally connected to a folding and clamping finger designated generally by reference numeral 110. The several folding and clamping fingers 110 constitute a folding means by which radial pleats are folded into the bag adjacent the open end thereof in the manner hereinafter described.

Each of the eight folding and clamping fingers 110 comprises a generally U-shaped rod 112 which includes a pair or parallel upwardly extending legs 112a interconnected at their lower ends by a horizontally extending bight portion 112b and carrying at their upper ends, a pair of inwardly turned parallel toes 112c. A flat clamping plate 114 extends between the parallel legs 112a at a location contiguous to the horizontal web 112b, and is of approximately the same size as one of the resilient pads 82 hereinbefore described. Near the upper ends of the parallel legs 112a at points spaced slightly below the points of pivotal connection of the folding and clamping finger 110 to the elongated crank link means 108 are a pair of radially inwardly extending bars 116. Each of the bars 116 has its radially outer end welded or otherwise suitably secured to, and extending normal to, one of the legs 112a of the U-shaped rod 112. Also projecting radially inwardly from each of the parallel legs 112a are a pair of stop tabs 120. Each stop tab 120 is positioned in vertical alignment with, and spaced from, one of two parallel bars 122 forming a part of the elongated crank link means 108 hereinafter to be described. The bars 116 are vertically aligned with, and during operation of the apparatus cooperate with, a pair of spaced, parallel actuator plates 118 which, as shown in FIGS. 3 and 4, are mounted on the upper side of the first intermediate subframe 30.

Each of the elongated crank link means 108 forming a part of the upper folding and clamping finger subassembly 90 includes, in addition to the parallel elongated bars 122, a cross-member 124 and a Y-shaped yolk including bars 126 and 128 which are joined to a neck bar 130. For the purpose of pivotally supporting the several elongated crank link means 108 for pivotation about a horizontal axis at a location immediate their length, each of the bars 34 of the first intermediate subframe has a pair of outer sleeves 132 and 134 welded thereto. A pair of supporting pivot sleeves 136 and 138 are spaced inwardly from the outer sleeves, and rotatably journal the opposite ends of a pivot shaft 141. A pair of support rods 140 are welded beneath each of the arms 126 and 128 and at their lower sides to the intermediate sleeves 136 and 138, so that the entire crank link means 108 can pivot about a horizontal pivotal axis which extends coaxially with respect to the axis of the pivot shaft 141. A tension spring 142 is connected between the free upper end of one of the parallel toes 112c and one of the bars 34.

The lower clamping finger subassembly 92 is constructed similarly to the upper folding and clamping finger subassembly 90. It includes a double acting pneumatic cylinder 146 which is slidably supported within the cylinder supporting socket sleeve 40, and can be adjusted upwardly or downwardly by means of a plurality of adjusting screws 148 extended through the end plate located at the lower end of the cylinder supporting socket sleeve. A piston rod 150 extends from the cylinder 146, and has its lower end secured to a drive plate 152. Circumferentially spaced around the drive plate 152 and secured to its outer periphery are a plurality of pairs of linkage brackets 154. Each pair of linkage brackets 154 serves to connect a lever arm 156 to the drive plate 152. Each lever arm 156 is pivotally connected by a pair of links 158 to an elongated crank link means 160 which is constructed identically to each of the crank link means 108 forming a part of the upper folding and clamping finger subassembly 90, and hereinbefore described. Like the several crank link means 108 of the upper folding and clamping finger subassembly 90, each of the crank link means 160 utilized in the lower clamping finger subassembly is pivotally mounted for pivotation about a horizontal axis which extends transversely with respect to the length of the respective crank link means. This is accomplished in the same fashion as has been previously described by securing the crank link means to a pair of pivotal supporting sleeves 162 which are mounted on the underside of the lower subframe 29 as shown in FIGS. 3 and 8.

At its radially outer end, each of the crank link means 160 is connected to an elongated clamping structure here illustrated as a clamping finger designated generally by reference numeral 164. Each of the clamping fingers 164 comprises a U-shaped rod 166 which includes a pair of upwardly extending parallel legs 166a and a horizontally extending bight or web portion 166b which interconnects the parallel legs at the upper end thereof. Secured to each of the legs 166a at a location near the lower end thereof is an inwardly extending stop tab 168 which is located below and in vertical alignment with one of the bars forming a part of the respective crank link means. A bar 170 is also secured to each of the legs 166a and extends radially inwardly normal thereto. The bars 170 are similar in construction, arrangement and function to the bars 116 referred to in describing the construction of the holding and clamping fingers 110 forming a part of the upper folding and clamping finger subassembly 90. The bars 170 are aligned with actuator plates 172 which are secured to the underside of the base subframe 29.

As has been previously explained, the base subframe 29 is circumferentially offset or staggered in relation to the first intermediate subframe 30, and this offset geometric relationship further applies to the several clamping fingers 164 carried at the radially outer ends of the crank link means 160 (see the sectional offset along line 3—3 in FIG. 1, and compare FIGS. 4 and 8). Thus, the clamping fingers 164, when actuated, will move, as hereinafter explained, from the dashed line position upwardly to the full line clamping positions shown in FIG. 3, in which clamping positions the clamping fingers 164 are disposed in juxtaposition to one of the resilient pads 82 which is located between a pair of the tube-supporting foot plate subassemblies 72 as shown in FIG. 8.

The pneumatic system utilized for actuating and controlling the sequence of operation of the pneumatic cylinders 94 and 146 is illustrated in FIG. 2 of the drawings. A pair of pneumatic fluid conduits 174 and 176 are connected to opposite ends of the cylinder 94, and a pair of pneumatic fluid conduits 178 and 180 are connected to opposite ends of the cylinder 146. Conduits 174 and 176 are connected to a spring loaded control valve 182 for the purpose of alternately receiving pneumatic fluid therefrom and discharging pneumatic fluid thereto as the piston within the pneumatic cylinder 94 is reciprocated. The control valve 182 is supplied with fluid from the conduit 184 which is supplied by a feed conduit 186 which receives pressurized power fluid from a compressor or the like (not shown). A pair of adjustable orifice vent ports 188 and 190 are provided for the purpose of venting pressurized pneumatic fluid to the atmosphere at certain times during the operation of the cylinder 94, and in a manner more specifically hereinafter explained.

Similarly, the conduits 178 and 180 are connected to receive pneumatic power fluid from, and discharge such fluid to, a spring loaded control valve 192. The spring loaded control valve 192 is connected to the feed conduit 186 by a conduit 194, and is, like the control valve 182, provided with a pair of adjustable orifice vent ports 196 and 198. The control valves 182 and 192 have respective valve shafts 200 and 202 projecting from one end thereof and connected to the valve element within the control valves for shifting the valves between operating positions.

For the purpose of controlling the direction of passage of pneumatic power fluid through the two control valves 182 and 192, a synchronizing system or means which includes a pneumatically driven motor 204 is utilized. This synchronizing means, to be next described, is a part of the moving means by which the clamping structure and folding means are actuated to form new pleats adjacent and radially outwardly from previously formed radial pleats in the bag or tubing, and for clamping these pleats in position alternately with the folding of new pleats. The alternating periodic movements of the clamping structure and the folding means are accomplished by the synchronizing means as it controls the actuation of the control valves 182 and 192 forming a part of the moving means used to move the folding means and the clamping structure. The pneumatically driven motor 204 is connected by a line 206 to the fluid conduit 186 for receiving pneumatic power fluid therefrom. The motor 204 has an output shaft 208 which has a pair of cam plates 210 and 212 spaced along the length thereof, and keyed thereto for rotation with the shaft. Each of the cam plates 210 and 212 has a 90° flat on one side of the plate. Thus, as the valve shafts 200 and 202 are projected by the springs of the spring loaded control valves 182 and 192 into following contact with the peripheries of the cam plates 210 and 212, the shafts are reciprocated inwardly against the bias of their respective springs during ¾ of the total rotation of the shaft 208, and allowed to be extended fully outwardly during ¼ of the rotation. The flat on the cam plate 212 extends over a circumferential angle of from about 0° to about 90° on the cam plate periphery at a time when the flat on the cam plate 210 extends over an angle of from about 225° to about 315° on the cam plate periphery.

Therefore, at one point during rotation of the shaft 208 by the pneumatically driven motor 204, and occurring through approximately 120° of the total rotation of this shaft, one of the valve shafts 200 or 202 will be extended outwardly by its spring, such as is illustrated in FIG. 2 in the case of the shaft 202. During this time, pneumatic power fluid will be supplied via conduit 178 to the double acting pneumatic cylinder 146 to extend the piston rod 150 downwardly, and thereby actuate the lower clamping finger subassembly 92 to move the clamping fingers 164 upwardly to the clamping positions illustrated in full lines in FIG. 3. At the same time, pneumatic power fluid will be exhausted through the conduit 180 to the valve 192, and will there be exhausted or vented to the atmosphere through the adjustable orifice vent port 196.

After the described actuation of the pneumatic cylinder 146 has occurred, the valve shaft 200 will ride up on the full circumferential portion of the cam plate 210, and therefore be biased inwardly against the opposing bias of the spring located in the control valve 182. In this position of the valve, pneumatic power fluid passes through the conduit 174 to the pneumatic cylinder 94 causing a retraction of the piston rod 98 into the cylinder, and a consequent retraction of each of the folding and clamping fingers 110 from the full line clamping position illustrated in FIG. 3 to the dashed line retracted position therein illustrated. Simultaneously, pneumatic power fluid is discharged through the conduit 176 to the valve 182 and from the valve 182 is vented to the atmosphere via the adjustable orifice vent port 188. The sequencing and synchronization of the action of the upper folding and clamping finger subassembly 90 with respect to the lower clamping finger subassembly 92 will be hereinafter explained in greater detail, and it will understood that the control of the times and periods of actuation of the pneumatic cylinders 94 and 146 relative to each other is controlled by the shapes of the cam plates 210 and 212 utilized.

In order to facilitate manual control of the actuation of the cylinder 146, and therefore of the clamping fingers 164 of the lower clamping finger subassembly 92, a manual override system 213 is provided. The manual override system is illustrated in detail in FIG. 9. This system includes a base block 214 upon which a track 216 is mounted. The control valve 192 is reciprocably mounted in the track 216, and its reciprocating movement can be effected by a hand control lever 220 which is pinned at 218 for pivotation. It will be perceived that by forcing the valve 192 to the right with the hand control lever at a time when the pneumatic motor 204 is stopped, the valve shaft 202 can be forced inwardly by contact with the cam plate 212 to shift the valve to a position causing retraction of the clamping fingers 164. The purpose of this manual control will be more clearly understood from the description of the operation of the apparatus which follows.

OPERATION

In the use and operation of the tube folding apparatus of the invention, a large elongated flexible tube 14 is first placed on the tube feeding drum 10 which is rotatably mounted on the shaft 12. The tube 14 is preferably of cylindrical configuration, and in a preferred embodiment is formed of a plastic or synthetic resin material which is flexible and to some extent resilient. When a large diameter tube is used, it is preferably wound upon the drum 10 after folding the tube either once or twice along one or two longitudinally extending fold lines which extend from one end of the tube to the other, and are parallel to the central axis of the tube.

On commencing the use of the folding apparatus, the tube 14 is manually pulled from the drum 10, and the mouth of the tube is flared outwardly to its fully distended circular configuration so that it can be passed over and around the upper guide rollers 60 carried on the top subframe 50. The tube is then pulled further down around the forming and folding structure 16 so as to pass the lower guide rollers 64 and pass over the static brake ring 68. It should be pointed out that the outside diameter of the static brake ring 68 is very slightly larger than the inner diameter of the fully opened tube 14, so that during the folding operation, some drag or frictional resistance is exerted by the brake ring on the tube to thereby resist longitudinal movement of the tube downwardly across the brake ring.

The tube 14 is then pulled further down along the outside of the forming and folding structure 16 until the open lower end of the tube contacts the foot plates 74. The clamping fingers 164 forming a part of the lower clamping finger subassembly are next moved upwardly from the dashed line retracted positions to the full line clamping positions illustrated in FIG. 3. This upward movement of the clamping fingers 164 is accomplished by use of the manual override system 213. The pneumatic motor 204 is deactivated and the hand control lever 220 is pivoted to throw the control valve 192 to a position such that the pneumatic cylinder 146 is actuated to extend the piston rod 150. This causes the several crank link means 160 to pivot about their respective horizontal pivotal axes so as to bring the clamping fingers 164 carried at the outer end thereof slowly upwardly.

As the outer ends of the crank link means 160 associated with the several clamping fingers 164 move upwardly, the bars 170 projecting normally inwardly from the parallel legs 166a of the U-shaped rod 166 contact the respective actuator plates 172. This causes the U-shaped rods 166 to pivot radially inwardly about the horizontal pivotal axes where they are connected to the crank link means. They thus close radially inwardly toward the tube, and ultimately press the lower end portion of the tube against the several resilient pads 82. In this way, the portion of the tube adjacent the open end is clamped at eight circumferentially spaced zones so that radial as well as longitudinal movement of the tube is prevented.

After the tube has been clamped in the manner described by use of the manual override system, the automatic pneumatic control system is then placed in operation to alternately actuate the pneumatic cylinders 94 and 146. First, the pneumatic motor 204 is actuated. The pneumatic cylinder 94 is then to extend the piston rod 98 by charging pneumatic fluid to this cylinder via the conduit 176. Concurrently, pneumatic fluid is discharged through the conduit 174, and is vented to the atmosphere at a controlled rate through the adjustable orifice vent port 190. As the piston rod 98 moves upwardly, the upper folding and clamping finger subassembly 90 is actuated so that its folding and clamping fingers 110 move from the dashed line position thereof to the full line position as illustrated in FIG. 3.

In undergoing this movement, the U-shaped rods 112 and the flat clamping plates carried therebetween swing radially outwardly and downwardly. In the course of this movement, the horizontal web or bight portion 112b of each U-shaped rod 112 contacts the inner side of the tube 14 and commences to push it outwardly and downwardly. As the pivoting movements of the folding and clamping fingers 110 continue, the U-shaped rods 112 commence to move predominantly downwardly. In doing so, they carry a bight of the tube 14 formed around the lower end or web portions 112b of the U-shaped rods downwardly and outside of the portion of the tube adjacent the open end thereof. This latter portion of the tube is clamped against radial and longitudinal movement by the several clamping fingers 164.

As the folding and clamping fingers 110 approach the end of their downward movement, the bars 116 which project normal to, and radially inwardly from, the parallel legs 112a of the U-shaped rod 112 contact the actuator plates 118. This causes a radially inward swinging movement of the lower ends of the parallel legs 112a and the horizontal web 112b of the U-shaped rod 112. The flat clamping plate 114 carried between the legs 112a is also brought inwardly against the annular band of the tube which lies radially inwardly from the folding and clamping fingers 110.

Ultimately, the folding and clamping fingers 110 of the upper folding and clamping finger subassembly 90 arrive at the full line position shown in FIG. 3. Here it can be perceived that a bight has been formed in the tube 14 so that there is a part of the tube which lies radially outwardly of the folding and clamping fingers 110, and another annular band of the tube which lies radially inwardly of these fingers. It will further be noted (FIG. 3) that the folding and clamping fingers 110, and specifically the U-shaped rods 112, are pivoted down to clamping positions immediately above the horizontally extending foot plates 74. These clamping positions are circumferentially offset from, and alternately located with respect to, the clamping positions occupied by the clamping fingers 164 of the lower clamping finger subassembly 92.

A helpful recapitulation of the action sequence of the tube folding machine to the present point in the description of its operation can be had by referring to diagrammatic action sequence FIGS. 6a–6c. In FIG. 6a, the status of the apparatus is shown after the tube 14 has been pulled down over the forming and folding structure 16 to the tube supporting, horizontally extending foot plates 74, but prior to actuation of either the lower clamping finger subassembly 92 or the upper folding and clamping finger subassembly 90. In FIG. 6b, the lower clamping finger subassembly 92 has been actuated by the manual override system 213 to move the clamping fingers 164 upwardly, and thereby clamp an annular band at the lower end of the tube against the resilient pads 82.

FIG. 6c illustrates the status of the system after the upper folding and clamping finger subassembly 90 has been automatically actuated to bring the upper folding and clamping fingers 110 downwardly to effect a further development of the radial accordian pleats. From FIG. 6c, it can be perceived that an annular band of the tube 14 lies inside of the lower clamping fingers 164, and that the tube then passes through a bight over the top of these clamping fingers for connection to a second, radially outwardly lying annular band which lies outside of the lower clamping fingers 164, but inside of the folding and clamping fingers 110 carried by the upper folding and clamping finger subassembly 90. A second annular band of the tube 14 is then joined by a bight to a third annular band of the tube which lies radially outwardly from the folding and clamping fingers 110. Differently described, the tube 14 includes the circumferentially spaced clamped zones which are clamped against radial and longitudinal movement by the clamping fingers 164, an outwardly lying first annular band of the tube, and a second annular band which lies yet further radially outwardly, with the two annular bands and the part of the tube containing the circumferentially spaced clamped zones being interconnected in a generally S-shaped array.

It should be pointed out that it will frequently be desirable to prevent the upper folding and clamping fingers 110 from being pivoted outwardly and downwardly at a high rate of speed. The reason for this is that some types of flexible material used in the tube construction may have little capability of withstanding the slight radial stretching, and the "draw" which is experienced as the tube is hooked over the ends of the U-shaped rods 112, and forced downwardly to the outside of the clamping fingers 164. In other words, a relatively gentle impact and moderate rate advancing movement is needed on the part of the folding and clamping fingers 110 of the subassembly 90 at this time, as well as during subsequent folding strokes. The speed of this movement can be controlled by adjustment of the adjustable orifice vent port 190 so that the rate at which pneumatic power fluid is discharged from the pneumatic cylinder 94 via the conduit 174 is controlled, and to some extent retarded.

After the status of the upper folding and clamping finger subassembly 90 and the lower clamping finger subassembly 92 has been brought to that illustrated in 6c, continued revolution of the shaft 208 of the pneumatic motor 204 causes the cam plates 210 and 212 to be further rotated, shifting the control valve 192, while maintaining the same status of the control valve 182. The folding and clamping fingers 110 of the upper folding and clamping finger subassembly 90 therefore remain in their downwardly pivoted clamping positions illustrated in FIG. 6c, but the pneumatic cylinder 146 is now actuated to retract the piston rod 150 into the cylinder 146. This causes downward pivotation of the clamping fingers 164 from the full line position illustrated in FIG. 3, to the retracted, dashed line position there illustrated, and also shown diagrammatically in FIG. 6d.

It will be understood, of course, that at this time there are eight of the folding and clamping fingers 110 which are also in clamping positions and perform the same function as the single folding and clamping finger 110 illustrated diagrammatically in FIG. 6d. These eight folding and clamping fingers are circumferentially located around the tube, and function to clamp and hold the tube against radial and longitudinal or axial movement at this time. Moreover, the clamping effect of the downwardly pivoted folding and clamping fingers 110 tends to draw the annular bands of tubing 14 in the developing pleat folds radially inwardly and to stretch the bands tightly over the resilient pads 82 disposed in the circumferential spaces between the locations of the folding and clamping fingers 110. Thus, the resilient pads 82 constitute a means which cooperates with the folding means constituted by the folding and clamping fingers 110 to engage the annular bands formed on the tube by the folding means, and to temporarily restrain the bands and the tube against radial and axial movement. Note, e.g. at the left in FIG. 3, the finger 110 is in a position engaging, at the inner and outer sides thereof, a pair of annular bands (shown in dashed lines), with the pad 82 in engagement with a portion between the bands and the tube end. Thus, the tube 14 is positioned for a now repeated clamping movement of the clamping fingers 164 by their upward movement to the clamping positions illustrated for these fingers in FIG. 6e.

This movement is effected, as will now be understood, by continued rotation of the cam plate 212 so as to throw the control valve 192 to an alternate position which causes pneumatic power fluid to be charged to the cylinder 146 via the conduit 178, and to be discharged from this cylinder through the conduit 180 and vented to the atmosphere through the adjustable orifice vent port 196. Stated in another way, the configurations of the cam plates 210 and 212 are such that, during the period when the folding and clamping fingers 110 are in their lowered, clamping positions, the lower clamping fingers 164 move downwardly from their clamping positions as shown in FIG. 6c to a retracted position, and then return to a clamping position which is outside of the radially outermost annular band of the tube 14 as shown in FIG. 6e. That the clamping fingers 164 can move at this time to the outside of the radially superimposed annular bands in the formed accordian pleats will be understood when it is recalled that immediately prior to moving into its uppermost position, the U-shaped rods 166 lean outwardly slightly. They are then pivoted into their directly vertically extending clamping positions by reason of the contact which occurs between the bars 170, and the several overlying actuator plates 172 carried on the lower side of the base subframe 29. This contact, along with the continued upward movement of the swinging crank link means 160, causes a rapid radially inwardly swinging movement of the U-shaped rods 166 about their respective points of pivotal connection to the outer ends of the crank link means 160 upon which they are carried.

After the clamping fingers 164 have been again pivoted upwardly to their clamping positions at eight locations around the periphery of the tube, and are functioning to securely clamp the superimposed annular bands of the tube against both radial and longitudinal movement, the continuing rotational movement of the shaft 208 brings the cam plate 210 to a position where the control valve 182 is shifted so as to cause retraction of the piston rod 98 into the pneumatic cylinder 94. This movement causes upward pivotation of the several crank link means 108 of the upper folding and clamping finger subassembly 90, and consequent upward withdrawal and retraction of the folding and clamping fingers 110.

When fully retracted, the folding and clamping fingers 110, and the crank link means 108 to which they are connected, occupy the positions depicted in dashed lines in FIG. 3. In examining this figure, it will be noted that in order to prevent gravitational force from causing undesired downward pivotation of the U-shaped rods 112 carried on the outer ends of the crank link means 108, the tension springs 142 are provided, and conjunctively with the stop tabs 120 hold the U-shaped rods in the illustrated dashed line position. The stop tabs limit clockwise pivotal movement by the U-shaped rods 112. It may be here pointed out that no counterpart for the tension springs 142 is required in the case of the clamping fingers 164 of the lower clamping finger subassembly 92, because at the time that these clamping fingers have been brought to the retracted or dashed line position illustrated in FIG. 3, gravity pulls the fingers down until the stop tabs 168 prevent further downward movement.

One complete cycle of the folding operation has now been completed. At this time, the status of the tube 14 and of the upper folding and clamping finger subassembly 90, and the lower clamping finger subassembly 92 is that which is shown in FIG. 6f. This status of the subassemblies 90 and 92 is the same as that which is shown in FIG. 6b. The synchronized movements of the folding and clamping fingers are thereafter continued in repeating the described cycle to form additional radially superimposed annular bands of the tube. When all of the tube, or such part thereof as may be desired, has been folded into the pleats, the automatic control of the pneumatic cylinders 94 and 146 is terminated, and the manual override allowing individual control of the lower clamping finger subassembly 92 is utilized to bring the clamping fingers 164 to the retracted position illustrated in FIG. 6h.

At this time the folding and clamping fingers 110 of the upper folding and clamping finger subassembly 90 are retracted as shown. The radially superimposed bands of the tubing in accordian pleat form are resting upon the several horizontally extending foot plates 74. Strapping or some similar fastening means, is then used to encircle or clamp the bands in radially superimposed relation. This is accomplished while the several radially superimposed bands are still resting upon the horizontally extending foot plates 74. When this has been achieved, the foot plates can be removed from the forming and folding structure 16 by sliding the rods 76 outwardly from the slide blocks 78. Removal of the foot plates 74 will permit the pleated tube to slide downwardly to rest upon the floor as shown in FIG. 6h.

With the fastened pleated tube resting on the floor, the bight of a sling is placed through the sling-receiving eye 20 of the lifting arm 18, and the several lines of the sling are attached to the lower portion of the forming and folding structure 16. The forming and folding structure 16 is then lifted upwardly by means of the cantilevered lifting arm 18 which is actuated by a lifting winch, hydraulic cylinder or other suitable lifting device. When the forming and folding structure 16 is lifted upwardly above the pleated tube which rests upon the floor, the pleated tube can then be removed and stored or packaged for shipment. After removal of the pleated tube, the forming and folding structure 16 is again lowered to the floor, and the horizontally extending foot plates 74 are remounted by extending the support rods 76 through the slide blocks 78. The apparatus is now ready for another folding operation for the purpose of folding another tube into a series of radial accordian pleats.

In FIG. 7 of the drawings, another method of utilizing the folding apparatus of the invention is illustrated. Here the structure which has been described is shown in use for concurrently folding two concentrically positioned tubes. Two tubes are nested in this way where a double-walled or double-thickness bag is to be formed, as well as in other utilizations.

For the purpose of concurrently forming pleat folds in two concentrically arranged tubes, a second tube is rested on top of the top subframe 50 upon the several radially extending frame members 36 hereinbefore described. The second tube, denominated by reference numeral 222 in FIG. 7, is folded in a zigzag of Sfold configuration as it lies atop the top subframe 50 of the folding and forming structure 16. The open mouth of the second tube 222 is then opened and is passed over and outside of the upper guide rollers 60 and the lower guide rollers 64, then outside of the static brake ring 68 and down to the point where the lower edge around the opening to the tube contacts the several horizontally extending foot plates 74. When this has been accomplished, the other of the two tubes is unrolled from the drum 10 and is passed over the outside of the tube 222 already in position around the forming and folding structure 16. The tube unrolled from the drum is positioned so that its lower edge adjacent the opening to the tube also contacts the several horizontally extending foot plates 74. Alternatively, both of the tubes 14 and 222 can be pulled down over he forming structure 16 simultaneously.

With the two tubes 14 and 222 so positioned, the folding mechanism is started and operated in the manner hereinbefore described, with the upper folding and clamping finger subassembly 90 and the lower clamping finger subassembly 92 performing the same functions as have been described. As pleats are folded into the two superimposed, concentrically arranged tubes, each of the tubes will be translated longitudinally down along the outer side of the forming and folding structure 16, with incremental advances occurring each time the folding and clamping fingers 110 of the upper folding and clamping finger subassembly are pivoted downwardly. The inside tube will be pulled out of the S-fold configuration which characterizes it in its position atop the forming and folding structure 16 as payout is demanded by the folding action of the folding and clamping fingers 110.

Completion of the folding of the two concentrically oriented tubes is accomplished in substantially the same way as has been described as characteristic of the single tube operation. The product developed has advantage with respect to the pleat folded single tube, however, in that it is double-walled or doublethickness, and thus is a much stronger structure when unfolded and placed in use.

An alternate embodiment of the crank link means 108 and 160 forming a part of the clamping finger subassemblies 90 and 92, and hereinbefore described, is illustrated in FIG. 10 of the drawings. In the crank link means shown in FIG. 10, a pair of vertically superimposed bars 226 and 228 are utilized in place of each of the bars 122 hereinbefore described as constituting structural elements within the previously described crank link means. Further, the cross-member 24 previously described is replaced by a broad spacer plate 230 which spaces the bars 226 and 228 in a manner illustrated. Replacing the bars 126 and 128 previously described are two pairs of vertically spaced bars 232 and 234 which are spaced above each other by the spacer plate 230. Each of the pairs of bars 232 and 234 converge so that these bars are joined to the neck bar 130 previously described. It will further be noted in referring to FIG. 10 that the lower bars 234 in each of the bar pairs 232 and 234 is pivotally supported on a pivot shaft 141 mounted in receiving sleeves 132 and 134 as hereinbefore described.

The purpose of utilization of the vertically spaced pairs of elongated bars 226 and 228 and pairs of convergent bars 232 and 234 is to facilitate the slidable mounting between each of the bar pairs 226 and 228 of an adjusting shaft 236. Each adjusting shaft 236 carries a plurality of transversely extending bolt holes which function to selectively receive a pair of retaining bolts 240. At its outer end, the shaft 236 is pivotally connected to the respective clamping finger 110 or 164 in the manner hereinbefore described.

The embodiment of the crank link means shown in FIG. 10 affords the advantage of adjustability of the radial position of the clamping fingers 110 of the folding and clamping finger subassembly 90. The modified embodiment of the crank link means illustrated in FIG. 10 will also be utilized, in addition to use for connection to the clamping fingers 110, in adjustably locating the clamping fingers 164 forming a part of the lower clamping finger subassembly 92.

Thus, the clamping fingers 110 and 164 in both of the clamping finger subassemblies 90 and 92 can be moved radially inwardly or outwardly in the clamping positions attained by them during operation of the apparatus. This adjustability, in conjunction with the ability in the use of the apparatus to radially adjust the positions of the resilient pads 82 and the foot plates 74 enable variously sized tubes to be pleat folded on the apparatus. It will, of course, be generally desirable to vary the size of the brake ring 68 to accommodate the varying diameter of different sizes of tubes which are fed to the apparatus, but such interchange of brake ring sizes is relatively easily accomplished, and the brake ring is not actually a critical and required part of the apparatus.

Although certain preferred embodiments of the present invention have been herein described in order to illustrate the basic principles upon which the invention is based, it will be understood that various changes and innovations can be made in the illustrated and described structures without departure from such basic principles of the invention. For example, the cylinders 94 and 146 can be hydraulically rather than pneumatically powered. All such changes and innovations are therefore deemed to be encompassed within the spirit and scope of the invention, except as the same may be necessarily limited by the appended claims, or reasonable equivalents thereof.

What is claimed is:

1. A method for folding an elongated flexible tube having at least one open end into a series of circular, radially superimposed, accordian pleats comprising:
   placing the tube in fully radially extended, substantially full diameter, tubular form;
   clamping the tube against radial and longitudinal movement at a plurality of circumferentially spaced first clamping zones which extend longitudinally of the tube by a distance substantially equivalent to the width of the pleats desired;
   forcing a first annular band of the tube which is located longitudinally contiguous to said clamping zones radially outwardly and longitudinally with respect to the longitudinal axis of the tube, and to a position in which said first band is radially superimposed over said clamping zones and is of a longitudinal dimension at least as great as the longitudinal extent of such zones and as the width of the pleats desired, while concurrently moving the remainder of the tube on one side of the clamped zones longitudinally toward said clamped zones by a distance which is twice the width of the first annular band, and concurrently forming from said remainder of the tube, a second annular band located radially outwardly from, and superimposed over and around, and connected through a pleat-fold line to, said first annular band, whereby said clamped zones and first and second annular bands are interconnected in a generally S-shaped array;
   clamping said first annular band at a plurality of circumferentially spaced second clamping zones thereon which are radially and circumferentially aligned with the spaces between said first clamping zones, said clamping of said first annular band forcing said first annular band radially inwardly against said first clamping zones in said tube and preventing radially outward movement and longitudinal movement thereof, and concurrently opposing radially inward movement of the tube in said first clamping zones;
   releasing said first clamping zones from the described clamping thereof after said first annular band is clamped at said second clamping zones; then
   while said first annular band is clamped radially inwardly against the tube in said first mentioned clamping zones, clamping said second annular band radially inwardly against said first annular band to force said first band against the portion of the tube in which said first clamping zones are located, said clamping of the second annular band retaining the second band, first band and portion of the tube defining said first clamping zones against radial and longitudinal movement; then
   sequentially forming additional interconnected annular bands radially outwardly from and superimposed over, said first and second annular bands.

2. A method for folding an elongated flexible tube as defined in claim 1 and further characterized as including the steps of continuing to form additional interconnected annular bands radially outwardly from said first and second annular bands until a desired number of radially superimposed accordian pleats have been folded into said tube; then
   fastening said accordian pleats against unfolding to facilitate transport of the pleated tube from one location to another.

3. A method for folding an elongated flexible tube as defined in claim 1 and further characterized as including the step of frictionally resisting said longitudinal movement of said tubing during said forcing of said first annular band radially outwardly and longitudinally to thereby prevent slack from developing in the tubing.

4. A method for folding an elongated flexible tube as defined in claim 1 wherein placing of the tube in full diameter tubular form is accomplished by
   unrolling the tube from a supporting drum upon which the tube is rolled; and
   pulling an open end of the tube over a forming and folding structure having an outside diameter substantially equal to the full diameter of said tube.

5. A method for folding an elongated flexible tube as defined in claim 1 and further characterized in including placing a second tube concentrically within said first mentioned tube to form a double-walled tube having said accordian pleats formed in both of said tubes.

6. A method for folding an elongated flexible tube as defined in claim 5 wherein said placement of said second tube is accomplished by:
   unrolling a portion of said first-mentioned tube carrying said open end from a drum;
   opening out said open end;
   placing a forming and folding structure beneath, and spaced downwardly from, said drum;
   positioning said second tube over said forming and folding structure and between said forming and folding structure and said drum;
   pulling said open end of said first-mentioned tube outwardly around and over said second tube;
   aligning said open ends of said first-mentioned and second tubes; and
   pulling portions of said first-mentioned and second tubes down over and around said forming and folding structure while keeping their open ends aligned to thereby place both of said tubes in said fully radially extended, substantially full diameter form in which said portions of said tubes are positioned concentrically relative to each other.

7. A method for folding an elongated flexible tube as defined in claim 2 wherein placing of the tube in full diameter tubular form is accomplished by
   unrolling the tube from a supporting drum upon which the tube is rolled; and
   pulling an open end of the tube over a forming and folding structure having an outside diameter substantially equal to the full diameter of said tube.

8. A method for folding an elongated flexible tube as defined in claim 7 and further characterized in including placing a second tube concentrically within said first mentioned tube to form a double-walled tube having said accordian pleats formed in both of said tubes.

9. The method defined in claim 8 and further characterized as including the step of yieldingly resisting movement of said concentric tubes to prevent the development of excessive slack in the tubes adjacent the band forming location therealong.

10. Apparatus for folding an elongated tube of flexible material into a plurality of radially superimposed accordian pleats comprising:
- a forming structure for internally shaping the tube to a substantially cylindrical, full diameter form while permitting longitudinal movement of the tube over the outside of the forming structure;
- a plurality of oscillating, circumferentially spaced, first clamping fingers disposed in circular array about the axis of a tube passed over said forming structure, and simultaneously oscillatable from clamping positions radially outward of, and in close proximity to, said forming structure, to retracted positions clear of contact with a tube passed over said forming structure;
- a plurality of oscillating, circumferentially spaced, second clamping fingers disposed in circular array about the axis of a tube passed over said forming structure, and simultaneously oscillatable from retracted positions within said forming structure to bight-forming and clamping positions located radially outward of said forming structure and in the spaces between said first clamping fingers when the first clamping fingers are in their clamping positions;
- means connected to said first clamping fingers and said second clamping fingers and mounted on said forming structure for actuating said first and second clamping fingers between the clamping positions of the fingers and the retracted positions of the fingers;
- synchronizing means operatively engaging said actuating means for synchronizing the movements of said fingers caused by said actuating means in an out of phase movement whereby said first clamping fingers move to their respective clamping positions before said second clamping fingers move to their respective bight-forming and clamping positions, then remain in their respective clamping positions until said second clamping fingers attain their clamping positions, then move to their retracted positions and back to their clamping positions while said second fingers remain in their respective clamping positions; and
- feeding means cooperating with said second clamping fingers for feeding the tube in longitudinal increments into radially contiguous bights as said second fingers undergo oscillation.

11. Apparatus for folding an elongated tube as defined in claim 10 wherein said means connected to said first and second clamping fingers for actuating said first and second clamping fingers comprises:
- a first piston and cylinder powering device;
- first linkage means connected between said first piston and cylinder powering device and said first clamping fingers to cause pivotation of each of said first clamping fingers about a horizontal axis in moving between said clamping and retracted positions when the piston of said first piston and cylinder powering device is extended and retracted by the cylinder thereof;
- a second piston and cylinder powering device; and
- second linkage means connected between said second piston and cylinder powering device and said second clamping fingers to cause pivotation of each of said second clamping fingers about a horizontal axis in moving between said clamping and retracted positions when the piston of said second piston and cylinder powering device is extended and retracted by the cylinder thereof.

12. Apparatus for folding an elongated tube as defined in claim 10 wherein said forming structure comprises:
- a base substructure;
- a lower subframe mounted on the top of said base substructure and having said first clamping fingers pivotally mounted on said lower subframe;
- a first intermediate subframe supported at a location spaced vertically above said lower subframe and having said second clamping fingers pivotally mounted on said intermediate subframe; and
- a top subframe mounted above said first intermediate subframe, said subframes having vertically aligned outer peripheries of a size to substantially fully diametrically open a tube extended around the outside of said subframes.

13. Apparatus for folding an elongated tube as defined in claim 10 wherein said synchronizing means comprises:
- a motor having a shaft extending therefrom;
- a pair of cam plates on said shaft; and
- means responsive to contact with the surfaces of said cam plates and connected to said actuating means to cause said first clamping fingers to oscillate in alternating sequence with said second clamping fingers.

14. Apparatus for folding an elongated tube as defined in claim 10 wherein said feeding means comprises a drum having said tube rolled thereon and positioned for feeding said tube onto said forming structure as said tube unrolls from said drum.

15. Apparatus for folding an elongated tube as defined in claim 10 and further characterized as including tube supporting foot plate subassemblies mounted on said forming structure for supporting the pleated portion of said tube as pleats are folded therein.

16. Apparatus for folding an elongated tube as defined in claim 11 wherein said first linkage means comprises:
- a first drive plate secured to the piston of said first piston and cylinder powering device;
- a plurality of first lever arms spaced around said drive plate and each having one end pivotally connected to said drive plate; and
- a plurality of elongated crank link means each having one end pivotally connected to the end of one of said first lever arms opposite its end connected to said drive plate, and having its other end pivotally connected to one of said first clamping fingers, said crank link means each extending generally radially with respect to said drive plate, and said link means collectively positioning said first clamping fingers at horizontally spaced locations around said forming structure.

17. Apparatus for folding an elongated tube as defined in claim 11 wherein said second linkage means comprises:
- a second drive plate secured to the piston of said second piston and cylinder powering device;
- a plurality of second lever arms spaced around said second drive plate and each having one end pivotally connected to said second drive plate; and
- a plurality of additional elongated crank link means each having one end pivotally connected to the end of one of said second lever arms opposite its end connected to said second drive plate, and having its other end pivotally connected to one of said second clamping fingers, each of, said additional crank link means extending generally radially with respect to said second drive plate and collectively positioning said second clamping fingers at horizontally spaced locations around said forming structure.

18. Apparatus for folding an elongated tube as defined in claim 10 wherein said forming structure includes a plurality of vertically superimposed subframes mounted above a base substructure and collectively forming a vertically extending, polygonal cross-sectioned structure having a hollow interior; and wherein said first clamping fingers are pivotally supported on one of said subframes for pivotation about horizontal axes, each of said first clamping fingers oscillating downwardly from a vertically extending clamping position at the outer side of said forming structure to a retracted position inside said vertically extending, polygonally cross-sectioned structure; and wherein said second clamping fingers are pivotally supported on one of said subframes located above said one subframe for pivotation about horizontal pivot axes, each of said second clamping fingers oscillating upwardly from a vertically extending clamping position at the outer side of said forming structure to a retracted position inside said vertically extending polygonally cross-sectioned structure.

19. Apparatus for folding an elongated tube as defined in claim 15 wherein each of said foot plate subassemblies comprises:

a horizontally extending foot plate;
a plurality of parallel adjusting rods secured to and projecting from said foot plate, and
slide blocks secured to said forming structure and slidably receiving said adjusting rods whereby said foot plates can be demounted from said forming structure by sliding said rods out of said slide blocks.

20. Apparatus for folding an elongated tube as defined in claim 10 and further characterized as including a plurality of resilient pads mounted on said forming structure around the outer side thereof, each of said pads being positioned immediately adjacent one of the clamping positions into which one of said first or second clamping fingers move in the course of oscillating movement.

21. Apparatus for folding an elongated tube as defined in claim 20 and further characterized as including means movably supporting said resilient pads on said forming structure and facilitating radial movement of said pads relative to the longitudinal axis of a tube placed over and around said forming structure.

22. Apparatus for folding an elongated tube as defined in claim 21 wherein said means movably supporting said pads comprises:

a plurality of backing plates each having one of said pads secured thereto;
a plurality of adjusting rods projecting from each of said backing plates; and
slide blocks mounted on said forming structure and slidably receiving said adjusting rods.

23. Apparatus for folding an elongated tube as defined in claim 16 wherein each of said crank link means comprises:

a pair of fixed rods connected to one of said lever arms;
an extensible rod slidably positioned between said fixed rods and having an end connected to one of said fingers; and
means selectively engaging said extensible rod to said fixed rods in a selected position to thereby facilitate selective sizing of the overall length of said crank link means.

24. Apparatus as defined in claim 10 wherein said first clamping fingers are circumferentially spaced from each other in a circular overall array, and said second clamping fingers are spaced from each other and arranged relative to said first clamping fingers so that each second clamping finger oscillates to a clamping position which is located between the clamping positions occupied by two of said first clamping fingers during the oscillation thereof.

25. Apparatus as defined in claim 10 wherein said forming structure has a sixteen-sided polygonal cross-section lying in a plane extending normal to the axis of a tube extending over the outside of said forming structure, and wherein there are eight of said first clamping fingers oscillatable to eight circumferentially spaced clamping positions aligned with eight of the sides of said forming structure, and there are a plurality of said second clamping fingers mounted on said forming structure at locations facilitating oscillation to clamping positions between clamping positions assumed by pairs of said first clamping fingers equal in number to the number of said second fingers.

26. Apparatus as defined in claim 10 wherein said means for actuating said clamping fingers comprises:

a first double acting fluid powered cylinder drivingly connected to said first clamping fingers;
a second double acting fluid powered cylinder drivingly connected to said second clamping fingers;
first and second control valves connected to said first cylinder and said second cylinder, respectively, for charging power fluid to, and receiving power fluid from, the opposite ends of said first and second cylinders, each of said control valves having valve shafts projecting therefrom and into operative engagement with said synchronizing means and responsive to said synchronizing means to shift said control valves in a cyclical fashion.

27. Apparatus as defined in claim 12 wherein each of said subframes is characterized in having a sixteen-sided regular polygonal outer periphery, and wherein said forming structure has open interior spaces accommodating said first clamping fingers in a space within said base substructure when said first clamping fingers are in their retracted positions, and accommodating said second clamping fingers in a space between said first intermediate subframe and said top subframe when said second clamping fingers are in their retracted positions.

28. Apparatus as defined in claim 27 wherein said feeding means comprises a drum having said tube rolled thereon and positioned for feeding said tube onto said forming structure as said tube unrolls from said drum.

29. Apparatus as defined in claim 12 and further characterized as including tube supporting foot plate subassemblies mounted on said base substructure for supporting the pleated portion of said tube as pleats are folded therein.

30. Apparatus as defined in claim 16 wherein said second linkage means comprises:

a second drive plate secured to the piston of said second piston and cylinder powering device;

a plurality of second lever arms spaced around said second drive plate and each having one end pivotally connected to said second drive plate; and a plurality of additional elongated crank link means each having one end pivotally connected to the end of one of said second lever arms opposite its end connected to said second drive plate, and having its other end pivotally connected to one of said second clamping fingers, each of said additional crank link means extending generally radially with respect to said second drive plate and collectively positioning said second clamping fingers at horizontally spaced locations around said forming structure.

31. Apparatus as defined in claim 30 wherein each of said crank link means comprises:

a pair of vertically spaced, superimposed, radially extending bars pivotally connected to said one end of one of said lever arms; and an elongated adjusting shaft slidably mounted between said vertically spaced bars and adjustably extensible relative thereto, said adjusting shaft having an end portion projecting radially outwardly from said spaced bars and pivotally connected to one of said clamping fingers.

32. Apparatus as defined in claim 30 wherein said forming structure includes a plurality of vertically superimposed subframes mounted above a base substructure and collectively forming a vertically extending, polygonally cross-sectioned structure having a hollow interior; and wherein said first clamping fingers are pivotally supported on one of said subframes for pivotation about horizontal axes, each of said first clamping fingers oscillating downwardly from a vertically extending clamping position at the outer side of said forming structure to a retracted position inside said vertically extending, polygonally cross-sectioned structure; and wherein said second clamping fingers are pivotally supported on one of said subframes located above said one subframe for pivotation about horizontal pivotal axes, each of said second clamping fingers oscillating upwardly from a vertically extending clamping position at the outer side of said forming structure to a retracted position inside said vertically extending polygonally cross-sectioned structure.

33. Apparatus as defined in claim 32 and further characterized as including foot plate subassemblies mounted on said forming structure for supporting the pleated portion of said tube as pleats are folded therein.

34. Apparatus as defined in claim 33 wherein each of said foot plate subassemblies comprises:

a horizontally extending foot plate;

a plurality of parallel adjusting rods secured to and projecting from said foot plate, and slide blocks secured to said forming structure and slidably receiving said adjusting rods whereby said foot plates can be demounted from said forming structure by sliding said rods out of said slide blocks.

35. Apparatus as defined in claim 34 and further characterized as including a plurality of resilient pads mounted on said forming structure around the outer side thereof, each of said pads being positioned immediately adjacent one of the clamping positions into which one of said first or second clamping fingers move in the course of oscillating movement.

36. Apparatus as defined in claim 35 and further characterized as including means movably supporting said resilient pads on said forming structure and facilitating radial movement of said pads relative to the longitudinal axis of a tube placed over and around said forming structure.

37. Apparatus as defined in claim 36 wherein said means movably supporting said pads comprises:

a plurality of backing plates each having one of said pads secured thereto;

a plurality of adjusting rods projecting from each of said backing plates; and slide blocks mounted on said forming structure and slidably receiving said adjusting rods.

38. Apparatus as defined in claim 37 wherein said first clamping fingers are circumferentially spaced from each other in a circular overall array, and said second clamping fingers are spaced from each other and arranged relative to said first clamping fingers so that each second clamping finger oscillates to a clamping position which is located between the clamping positions occupied by two of said first clamping fingers during the oscillation thereof.

39. Apparatus as defined in claim 38 wherein said forming structure has a sixteen-sided polygonal cross-section lying in a plane extending normal to the axis of a tube extending over the outside of said forming structure, and wherein there are eight of said first clamping fingers oscillatable to eight circumferentially spaced clamping positions aligned with eight of the sides of said forming structure, and there are a plurality of said second clamping fingers mounted on said forming structure at locations facilitating oscillation to clamping positions between clamping positions assumed by pairs of said first clamping fingers equal in number to the number of said second fingers.

40. Apparatus for forming at least a portion of a tube into a series of radially superimposed substantially equiwidth annular bands in the form of pleats adjacent, and located radially outwardly from, an open end of the tube comprising:

a forming and folding framework;

a first internal support mounted on said forming and folding framework;

a second internal support spaced from said first internal support and also mounted on said forming and folding framework;

said first and second internal supports being positioned for holding a flexible tube to be formed opened to substantially its full diameter over a distance along the axis of the tube from the open end thereof, which distance is at least four times the transverse width of the radially superimposed annular bands which are to be formed therein;

clamping structure movably mounted on said forming and folding framework adjacent said second internal support and adjacent the open end of said tube placed over, and held open by, the second internal support, said clamping structure being movable to and from a clamping position of cooperation with and radially outward of said second internal support to restrain said tube against radial movement, and also against axial movement away from said open end in the direction of said first internal support;

folding means movably mounted on said forming and folding framework for movement relative thereto, and relative to said clamping structure, to thereby fold said tube radially outwardly and axially over said clamping structure when said clamping structure is in said clamping position, to thereby form a first pair of interconnected, concentric annular bands positioned radially outwardly of said clamping structure;

said second internal support comprising means cooperating with said folding means to engage said pair of annular bands formed on the tube by said folding means, and to engage the portion of the tube located between said bands and the open end of the tube, whereby the engaged bands and said tube portion located between the bands are temporarily restrained against radial and axial movement;

moving means mounted on said forming and folding framework and connected to said clamping structure and to said folding means for shifting said clamping structure to a position out of contact with the tube, and then to said clamping position against the radially outer side of the outermost pair of said annular bands while said cooperating means and folding means are effecting said engagement of said pair of annular bands and the portion of the tube located between said bands and the open end of the tube, and for periodically moving said folding means out of a status of cooperation with said cooperating means to disengage said annular bands and said tube portion located between said pair of annular bands and the open end of the tube, said moving means including:

synchronizing means for synchronizing the movement of said clamping structure and said folding means to form additional, annular, concentric bands radially aligned with said first pair of bands by periodically clamping against the radially outer side of the radially outermost of all of said bands with said clamping structure, and then, in an alternating, periodic sequence therewith, moving said folding means to draw the remaining unfolded portion of the tube into a pair of additional interconnected concentric annular bands lying radially outwardly of those bands previously formed.

41. Apparatus for forming at least a portion of a tube as defined in claim 40 wherein said means cooperating with said folding means comprises a plurality of resilient pads bearing against the inner side of said portion of the tube at a time when said folding means forces a portion of said tube radially inwardly against said resilient pads.

42. Apparatus as defined in claim 40 and further characterized as including supporting means secured to said forming and folding framework for supporting said tube after it has been formed into a series of radially superimposed annular bands.

43. Apparatus as defined in claim 42 wherein said supporting means comprises a plurality of foot plates.

44. Apparatus as defined in claim 40, wherein said means cooperating with said folding means comprises a plurality of spaced resilient pads positioned on said framework to bear against the inner side of the tube at a location near the open end thereof, and wherein said first internal support comprises a group of circumferentially spaced rollers collectively arranged in an array around said framework and positioned for rollably bearing against the inside of said tube at a location spaced along the length of said tube from said plurality of spaced resilient pads.

45. Apparatus as defined in claim 40 wherein said folding means comprises a plurality of fingers movably mounted on said forming and folding framework and movable downwardly and outwardly against said tube from the inside thereof.

46. Apparatus as defined in claim 40 wherein said disengaging means for moving said folding means out of a status of cooperation with said cooperating means comprises:

a reciprocating piston rod connected to said folding means; and means for extending and retracting the piston rod in response to said synchronizing means.

47. Apparatus as defined in claim 40 wherein said forming and folding framework includes a plurality of vertically tiered subframes collectively defining and bounding open interior spaces in which said clamping structure is located when in said first position out of contact with said tube, and in which said folding means is located when moved out of a status of cooperation with said cooperating means.

48. Apparatus as defined in claim 41 and further characterized as including means on said framework for supporting said tube after it has been formed into a series of radially superimposed annular bands.

49. Apparatus as defined in claim 48 wherein said supporting means comprises a plurality of foot plates.

50. Apparatus as defined in claim 49 wherein said folding means comprises a plurality of fingers movably mounted on said framework and movable arcuately downwardly and outwardly against said tube from the inside thereof.

* * * * *